US010334421B2

(12) United States Patent
Cho et al.

(10) Patent No.: US 10,334,421 B2
(45) Date of Patent: Jun. 25, 2019

(54) NEAR FIELD COMMUNICATION DEVICE

(71) Applicant: Samsung Electronics Co., Ltd., Suwon-si, Gyeonggi-do (KR)

(72) Inventors: Jongpil Cho, Hwaseong-si (KR); Youngjoo Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 129 days.

(21) Appl. No.: 15/458,051

(22) Filed: Mar. 14, 2017

(65) Prior Publication Data

US 2018/0070198 A1 Mar. 8, 2018

(30) Foreign Application Priority Data

Sep. 8, 2016 (KR) .................. 10-2016-0115860
Oct. 17, 2016 (KR) .................. 10-2016-0134493

(51) Int. Cl.
| | | |
|---|---|---|
| *H04W 4/80* | (2018.01) | |
| *H04L 7/033* | (2006.01) | |
| *H04W 52/52* | (2009.01) | |
| *G06K 7/10* | (2006.01) | |
| *H04B 5/00* | (2006.01) | |
| *H04B 5/02* | (2006.01) | |

(52) U.S. Cl.
CPC .......... *H04W 4/80* (2018.02); *G06K 7/10237* (2013.01); *H04B 5/0031* (2013.01); *H04B 5/0075* (2013.01); *H04B 5/02* (2013.01); *H04L 7/033* (2013.01); *H04W 52/52* (2013.01)

(58) Field of Classification Search
CPC ...... H04W 4/80; H04W 52/52; H04B 5/0031; H04B 5/0075; H04B 5/02; H04L 7/033; G06K 7/10237

USPC ................................... 455/41.1–41.3
See application file for complete search history.

(56) References Cited

U.S. PATENT DOCUMENTS

| | | | |
|---|---|---|---|
| 6,624,743 B1 | 9/2003 | Ikefugi et al. | |
| 9,281,874 B2 | 5/2016 | Lefley | |
| 9,373,882 B2 | 6/2016 | McFarthing | |
| 2009/0308937 A1 | 12/2009 | Yagi et al. | |
| 2014/0003548 A1* | 1/2014 | Lefley ................. | H04B 5/0075 375/268 |
| 2014/0218080 A1 | 8/2014 | Choke et al. | |
| 2016/0072556 A1 | 3/2016 | Lee et al. | |

(Continued)

FOREIGN PATENT DOCUMENTS

| | | |
|---|---|---|
| JP | 2001291081 A | 10/2001 |
| JP | 2009-130389 A | 6/2009 |

(Continued)

*Primary Examiner* — Nay A Maung
*Assistant Examiner* — Angelica M Perez
(74) *Attorney, Agent, or Firm* — Myers Bigel, P.A.

(57) ABSTRACT

Disclosed is a near field communication device which includes an antenna, a transmission amplifier, a matching circuit connected between the antenna and the transmission amplifier, and a transmitter. The transmitter transmits a transmit clock to the matching circuit through the transmission amplifier, extracts an extraction clock from a waveform formed in the matching circuit, stores a phase difference between the transmit clock and the extraction clock, and controls transmission of an information signal through the antenna, the transmission amplifier, and the matching circuit based on the phase difference.

20 Claims, 11 Drawing Sheets

(56) References Cited

U.S. PATENT DOCUMENTS

2016/0105188 A1 4/2016 Cho et al.
2016/0134450 A1 5/2016 Kusakabe et al.

FOREIGN PATENT DOCUMENTS

| JP | 2009130389 | * | 6/2009 | ............. G06K 17/00 |
| JP | 4992125 B2 | | 8/2012 | |

* cited by examiner

NEAR FIELD COMMUNICATION DEVICE

CROSS-REFERENCE TO RELATED APPLICATIONS

A claim for priority under 35 U.S.C. § 119 is made to Korean Patent Application No. 10-2016-0115860, filed Sep. 8, 2016, and to Korean Patent Application No. 10-2016-0134493, filed Oct. 17, 2016, the entire contents of each of which are hereby incorporated herein by reference.

BACKGROUND

Embodiments of the inventive concepts relate to a wireless communication device, and more particularly, to a near field communication device.

Radio frequency identification (RFID) refers to a form of communication that allows a reader situated at a short range from a card to supply power to the card and communicate with the card. Near field communication (NFC) is being used as an example of RFID. NFC provides high flexibility in that one communication device can perform both a function of the reader and a function of the card.

A center frequency defined in the NFC standard and a resonant frequency of an antenna of an NFC device may be different from each other due to an error of the process of manufacturing tolerance or errors, or because the center frequency and the resonant frequency were intentionally designed to be different. If the center frequency and the resonant frequency differ from each other, communication quality of the NFC device may be degraded. This degradation may reduce the effective distance at which the NFC device can communicate.

SUMMARY

Embodiments of the inventive concepts provide near field communication devices with improved communication quality.

According to an aspect of an embodiment, a near field communication device includes an antenna, a transmission amplifier, a matching circuit connected between the antenna and the transmission amplifier, and a transmitter. The transmitter transmits a transmit clock to the matching circuit through the transmission amplifier, extracts an extraction clock from a waveform formed in the matching circuit, determines information relating to a phase difference between the transmit clock and the extraction clock, and controls transmission of an information signal through the antenna, the transmission amplifier, and the matching circuit based on the determined information relating to the phase difference.

According to another aspect of an embodiment, a near field communication device includes an antenna, a transmission amplifier, a matching circuit connected between the antenna and the transmission amplifier, and a transmitter. The transmitter transmits a transmit clock to the matching circuit through the transmission amplifier, extracts an extraction clock from a waveform formed in the matching circuit by the transmit clock, and detects a difference between a resonant frequency of the antenna and the matching circuit and a center frequency of the transmit clock based on the transmit clock and the extraction clock.

According to another aspect of an embodiment, a near field communication device includes an antenna, a transmission amplifier, a matching circuit connected between the antenna and the transmission amplifier, and a transmitter. The transmitter operates in one of a phase measurement mode and a transmission mode. The transmitter transmits a transmit clock to the matching circuit through the transmission amplifier. The transmitter includes a multiplexer that selects a first clock as the transmit clock in the phase measurement mode so as to be transmitted to the transmission amplifier and selects a second clock as the transmit clock in the transmission mode so as to be transmitted to the transmission amplifier.

DETAILED DESCRIPTION

Figure 1:
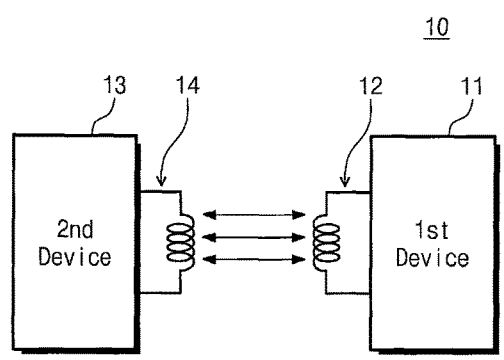
FIG. 1 is a schematic block diagram of an example of an NFC system.

Below, embodiments of the inventive concepts will be described in detail with reference to accompanying drawings to such an extent that one of ordinary skill in the art may implement embodiments of the inventive concepts. Like reference numerals refer to like part's throughout the figures and specification unless otherwise specified.

FIG. 1 is a schematic block diagram of an example of a near field communication (NFC) system 10. Referring to FIG. 1, the NFC system 10 includes first and second NFC devices 11 and 13. The first NFC device 11 is connected to a first antenna 12, and the second NFC device 13 is connected to a second antenna 14.

Each of the first and second NFC devices 11 and 13 may operate in a reader mode or a card mode. For example, the first NFC device 11 may operate in the reader mode, and the second NFC device 13 may operate in the card mode. The first NFC device 11 (operating in the reader mode) may transmit a first signal to the second NFC device 13 through electromagnetic induction between the first antenna 12 and the second antenna 14. The first signal may include a continuous wave for transmitting power and a first information signal that is added to the continuous wave. The first information signal may include, for example, information that is to be transmitted from the first NFC device 11 to the second NFC device 13.

The second NFC device 13 may obtain power from the continuous wave of the first signal. The second NFC device 13 may also obtain information from the first information signal of the first signal. The second NFC device 13 may add a second information signal to the continuous wave of the first signal and may transmit the second information signal to the first NFC device 11 as part of a second signal. For example, the second NFC device 13 may transmit the second signal to the first NFC device 11 through electromagnetic induction between the first antenna 12 and the second antenna 14.

In an embodiment, a center frequency of the near field communication (in the above example, the center frequency of the first and second signals) may be determined by the near field communication standard and may be, for example, 13.56 MHz. A resonant frequency of the first antenna 12 of the first NFC device 11 may be determined based on, for example, an intended purpose or use for the first NFC device 11 and a process used to manufacture the first NFC device 11. Likewise, a resonant frequency of the second antenna 14 of the second NFC device 13 may be determined based on, for example, an intended purpose or use for the second NFC device 13 and a process used to manufacture the second NFC device 13.

Resonant frequencies of the first and second antennas 12 and 14 of the first and second NFC devices 11 and 13 may be different from a center frequency of the near field communication due to, for example, the intended purpose(s) of the first and second antennas 12 and 14 or the manufacturing process or processes used to fabricate the first and second antennas 12 and 14. If the center frequency of the signals transmitted by the first and second NFC devices 11 and 13 differ from the resonant frequency of one or both of the first and second antennas 12 and 14, then the communication quality of the NFC system 10 may be degraded.

Figure 2:
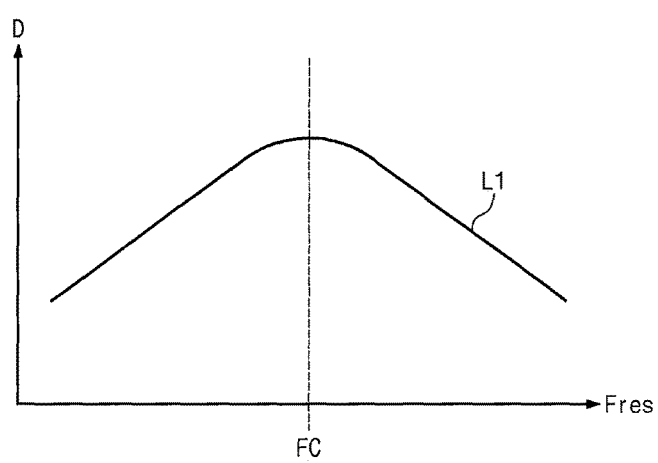
FIG. 2 is a graph illustrating how a difference between a center frequency of a signal transmitted by an NFC device and a resonant frequency of the antenna and matching circuit of the NFC device can influence the communication quality of an NFC system.

FIG. 2 is a graph illustrating how a difference between a center frequency of the signals transmitted by an NFC device and a resonant frequency of the antenna of the NFC device may influence the communication quality of the NFC system 10. In FIG. 2, the abscissa represents a resonant frequency Fres, and the ordinate represents a communication distance D in which near field communication is possible. The communication distance D in which near field communication is possible may be for example, the maximum communication distance or an average communication distance. A first line L1 shows a variation of the communication distance D as a function of the resonant frequency Fres in the NFC system 10.

Referring to FIGS. 1 and 2, the communication distance D has the maximum value when the resonant frequency Fres coincides with the center frequency FC of the transmitted signal. The communication distance D decreases as the resonant frequency Fres is increased above the center frequency FC, and the communication distance D also decreases as the resonant frequency Fres is decreased below the center frequency FC. That is, the communication distance D decreases as the resonant frequency Fres moves away from the center frequency FC.

A phase of a signal that is transmitted between the first and second NFC devices 11 and 13 may be delayed or advanced because of, for example, a path delay associated with the antennas 12 and/or 14. The communication distance D may be increased by adjusting a phase of the transmission signal when the resonant frequency Fres differs from the center frequency FC.

Figure 3:
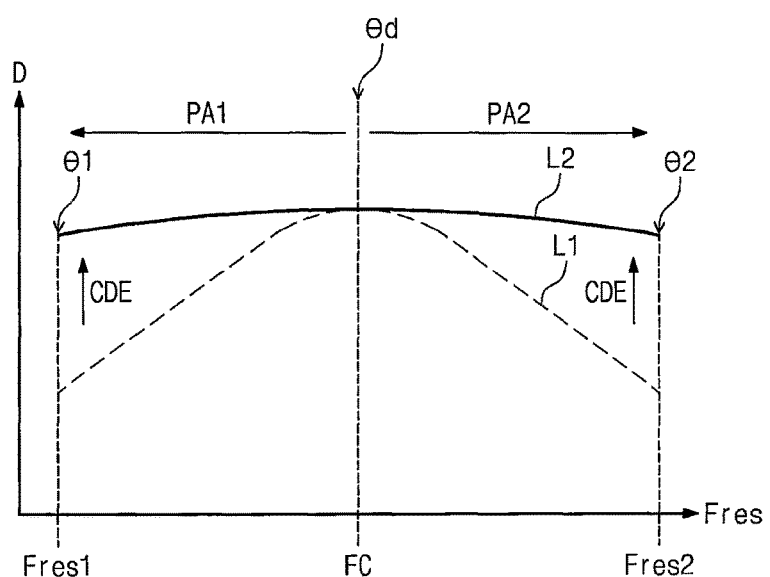
FIG. 3 is a graph illustrating how a communication distance of an NFC system may be extended by adjusting a phase of a signal transmitted by one of the NFC devices.

FIG. 3 is a graph illustrating how the communication distance D of the NFC system of FIG. 1 may be extended by adjusting the phase of the transmitted signals. Line L1 in FIG. 3 is identical to line L1 in FIG. 2. A second line L2 is further illustrated in FIG. 3 that shows the communication distance D when a phase of a signal transmitted by one of the NFC devices (such a signal is referred to herein as a "transmission signal") is adjusted to, for example, compensate for a difference between the resonant frequency Fres and the center frequency FC of the transmitted signal.

In an embodiment, a transmission signal may be sent at a default phase $\theta d$ when the resonant frequency Fres coincides with the center frequency FC. For example, the default phase $\theta d$ may be 0 degree or 180 degrees.

A phase of the transmission signal may be adjusted according to a first phase adjustment PA1 when the resonant frequency Fres is lower than the center frequency FC. For example, a phase of the transmission signal may be delayed or advanced as the resonant frequency Fres decreases. For example, a phase of the transmission signal may be adjusted to a first phase $\theta 1$ when the resonant frequency Fres decreases to a first resonant frequency Fres1.

A phase of the transmission signal may be adjusted according to a second phase adjustment PA2 when the resonant frequency Fres is higher than the center frequency FC. For example, a phase of the transmission signal may be advanced or delayed as the resonant frequency Fres increases. For example, a phase of the transmission signal may be adjusted to a second phase $\theta 2$ when the resonant frequency Fres increases to a second resonant frequency Fres2.

If selected appropriately, the first phase adjustment PA1 and the second phase adjustment PA2 may be used to provide a communication distance extension (CDE) for the NFC system. This communication distance extension CDE may decrease the reduction in the communication distance D that occurs when the resonant frequency Fres is different from the center frequency FC of the transmission signal. This decrease is illustrated graphically in FIG. 3 as the portions of the dotted lines at the resonant frequencies Fres1 and Fres2 that are between lines L1 and L2 (which are labelled CDE in FIG. 3). Accordingly, by applying the first phase adjustment PA1 or the second phase adjustment PA2 the communication quality of the NFC system 10 may be improved.

The inventive concepts provide NFC devices that automatically detect a difference between the resonant frequency Fres and the center frequency FC of the transmission signal, and adjust a phase of the transmission signal based on the detected difference. The technical features of the inventive concepts will be described below with reference to an example of an NFC device that operates in the card mode. However, the scope and spirit of the inventive concepts are not limited to the card mode and may be applied to NFC devices that operate in the reader mode.

Figure 4:
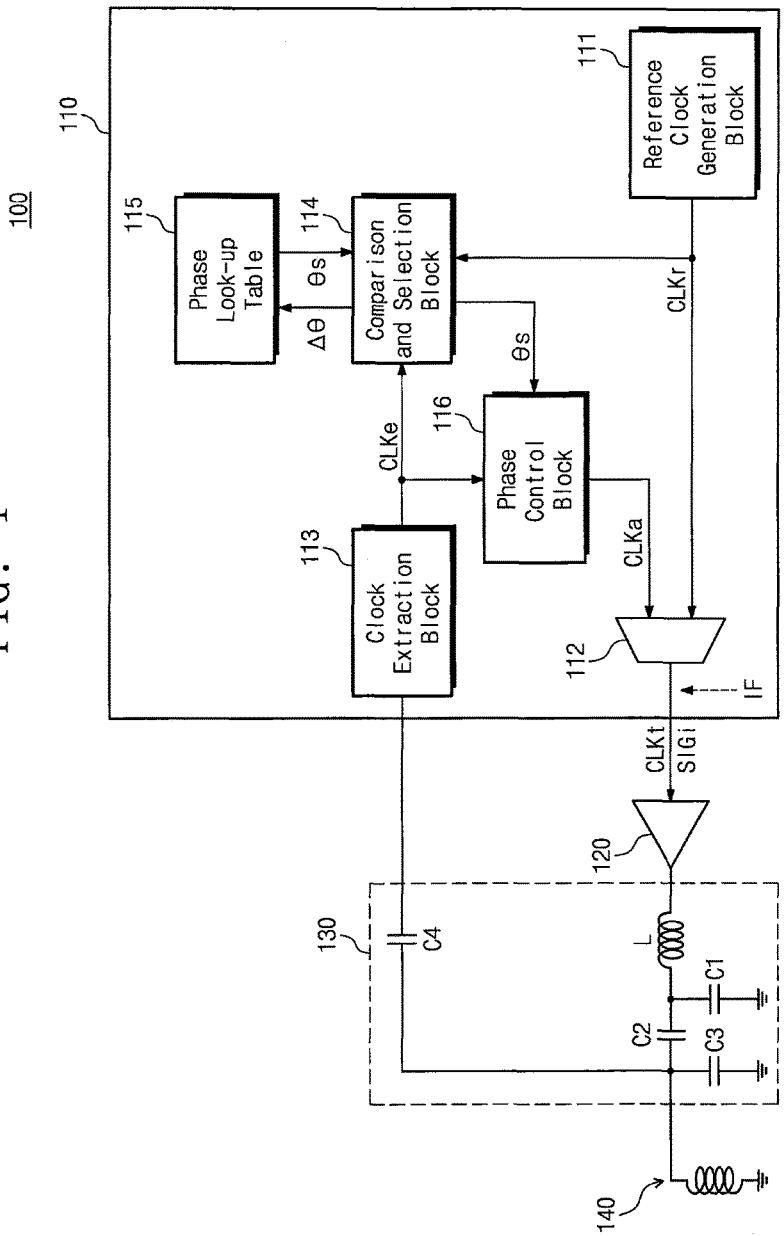
FIG. 4 is a schematic block diagram of an NFC device according to an embodiment of the inventive concepts.

FIG. 4 is a schematic block diagram of an NFC device 100 according to an embodiment of the inventive concepts. It will be appreciated that the schematic block diagram of FIG. 4 may not illustrate all of the components of the NFC device 100, but instead only illustrates certain of the signal transmission components that may be used in certain embodiments of the inventive concepts. Referring to FIG. 4, the NFC device 100 includes a transmitter 110, a transmission amplifier 120, a matching circuit 130, and an antenna 140.

The transmitter 110 may operate in a phase measurement mode and a transmission mode. In the phase measurement mode, the transmitter 110 may transmit a transmit clock CLKt to the transmission amplifier 120. The transmit clock CLKt may be any appropriate waveform such as, for example, a pulse signal having a certain frequency. The transmitter 110 may extract an extraction clock CLKe from a waveform, which is formed in the antenna 140 and the matching circuit 130 in response to the transmit clock CLKt. The transmitter 110 may store information regarding a phase difference between the transmit clock CLKt and the extraction clock CLKe. In the transmission mode, the transmitter 110 may adjust a phase of a transmission signal based on the stored information regarding the phase difference.

The transmitter 110 may include, for example, a reference clock generation block 111, a multiplexer 112, a clock extraction block 113, a comparison and selection block 114, a phase lookup table 115, and a phase control block 116.

The reference clock generation block 111 may generate a reference clock CLKr. For example, the reference clock CLKr may have a center frequency that is determined by the NFC standard. For example, the reference clock CLKr may have a center frequency of 13.56 MHz. The reference clock CLKr may be, for example, a pulse waveform. The reference clock CLKr may be transmitted to the multiplexer 112 and the comparison and selection block 114.

The multiplexer 112 may receive the reference clock CLKr from the reference clock generation block 111 and may receive an adjusted clock CLKa from the phase control block 116. In the phase measurement mode, the multiplexer 112 may output the reference clock CLKr as the transmit clock CLKt. The transmit clock CLKt may be transmitted to the transmission amplifier 120. In the transmission mode, the multiplexer 112 may output the adjusted clock CLKa. Transmission information IF may be added to the adjusted clock CLKa. The adjusted clock CLKa including the transmission information IF added thereto may be transmitted to the transmission amplifier 120 as an information signal SIGi.

The clock extraction block 113 may extract the extraction clock CLKe from a waveform formed in the antenna 140 and the matching circuit 130. For example, the clock extraction block 113 may output the extraction clock CLKe that has the same phase as the waveform formed in the antenna 140 and the matching circuit 130. The extraction clock CLKe may be transmitted to the comparison and selection block 114 and the phase control block 116.

The comparison and selection block 114 may compare the reference clock CLKr and the extraction clock CLKe in the phase measurement mode. In an embodiment, since the multiplexer 112 outputs the reference clock CLKr as the transmit clock CLKt in the phase measurement mode, the comparison and selection block 114 may be regarded as comparing phases of the reference clock CLKr and the extraction clock CLKe in the phase measurement mode. The comparison and selection block 114 may detect a phase difference $\Delta\theta$ between the reference clock CLKr and the extraction clock CLKe based on the result of the comparison. The detected phase difference $\Delta\theta$ may include information about a difference between the center frequency FC of the transmission signal and a resonant frequency of the antenna 140 and the matching circuit 130.

As described with reference to FIGS. 3 and 4, the communication distance D decreases due to a path delay that is generated when the resonant frequency Fres and the center frequency FC differ from each other. The path delay may be quantified as the phase difference $\Delta\theta$ between the reference clock CLKr and the extraction clock CLKe. That is, a difference between the resonant frequency and the center frequency may be quantified by the magnitude and sign of the phase difference $\Delta\theta$.

In the phase measurement mode, the comparison and selection block 114 may obtain phase selection information $\theta s$ corresponding to the phase difference $\Delta\theta$ with reference to the phase lookup table 115. The phase selection information $\theta s$ includes information about how much the phase of a transmission signal (e.g., a phase of the information signal SIGi) should be adjusted in the transmission mode to compensate for a difference between the resonant frequency and the center frequency.

As described with reference to FIG. 4, an amount that the phase is to be adjusted when the resonant frequency Fres differs from the center frequency FC may be quantified. The phase lookup table 115 may store a plurality of phase differences $\Delta\theta$ and corresponding phase selection information $\theta s$ for each of the phase differences. This information may be stored, for example, in the form of a table. The comparison and selection block 114 may obtain the phase selection information $\theta s$ corresponding to the phase difference $\Delta\theta$ with reference to the phase lookup table 115. The phase selection information $\theta s$ may be transmitted to the phase control block 116.

The phase control block 116 may store the phase selection information $\theta s$ in the phase measurement mode. In the transmission mode, the phase control block 116 may adjust the extraction clock CLKe (e.g., adjust the phase of the extraction clock CLKe) based on the phase selection information $\theta s$ to output the adjusted clock CLKa.

The transmitter 110 is described as including various blocks. The blocks included in the transmitter 110 may be implemented with hardware such as a semiconductor circuit or an integrated circuit, software driven in an integrated circuit, or a combination of hardware and software.

The transmission amplifier 120 may amplify a signal from the transmitter 110 and may transmit the amplified signal to the matching circuit 130.

The matching circuit 130 may provide impedance matching with regard to the antenna 140. The matching circuit 130 includes an inductor L and first to fourth capacitors C1 to C4. A first end of the inductor L is connected to an output of the transmission amplifier 120, and a second end thereof is connected to first ends of the first and second capacitors C1 and C2. A second end of the first capacitor C1 is connected to a ground electrode to which a ground voltage is supplied. A second end of the second capacitor C2 is connected to first ends of the third and fourth capacitors C3 and C4 and the antenna 140. A second end of the third capacitor C3 is connected to the ground electrode. A second end of the fourth capacitor C4 is connected to the clock extraction block 113 of the transmitter 110. It will be appreciated. that FIG. 4 illustrates one example matching circuit 130 and that matching circuits having different configurations may be provided in other embodiments. It will also be appreciated that the above-described connections may be direct or indirect connections.

Figure 5:
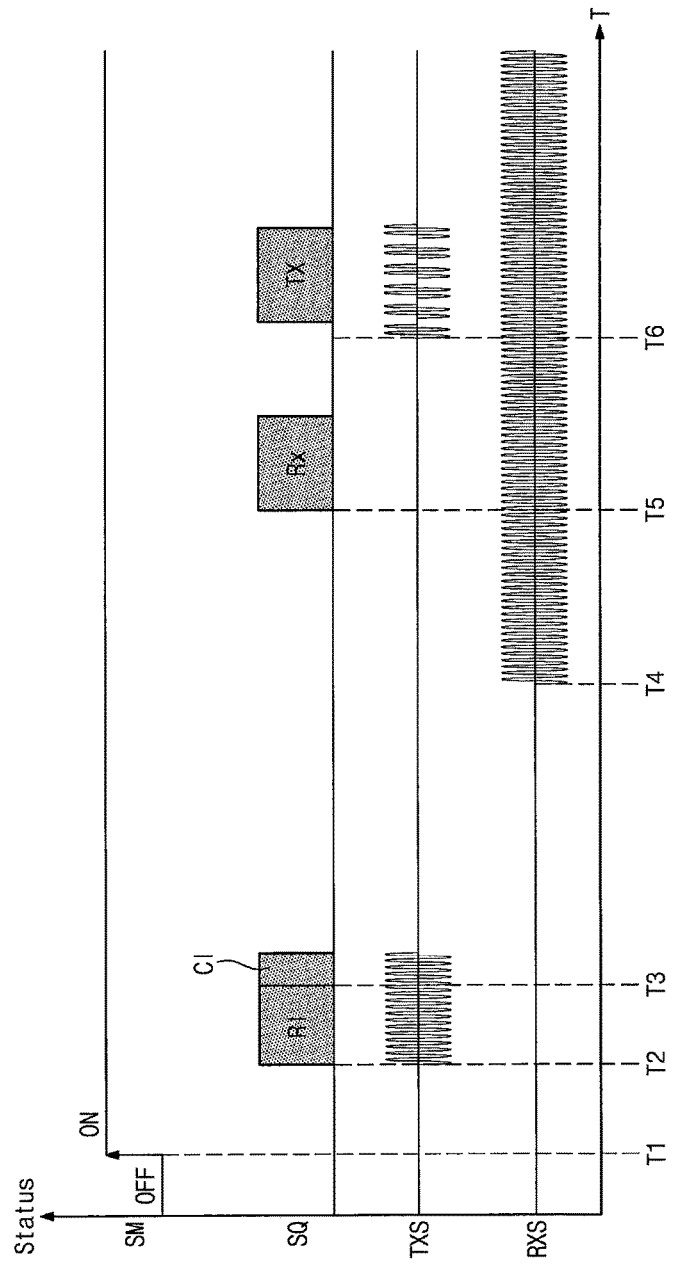
FIG. 5 is a graph illustrating an example in which the NFC device of FIG. 4 performs phase measurement and transmission in a card mode.

FIG. 5 is a graph illustrating an example in which the NFC device 100 of FIG. 4 performs phase measurement and transmission in a card mode. In FIG. 5, the abscissa represents time T, and the ordinate represents a service mode SM, an operating sequence SQ, a transmit signal TXS, and a receive signal RXS of the NFC device 100.

Referring to FIGS. 4 and 5, the service mode SM of the NFC device 100 is changed from an OFF state to an ON state at a point in time T1. For example, power may be supplied to the NFC device 100, or the NFC device 100 may be activated.

After the service mode SM is set to the ON state, the transmitter 110 may enter the phase measurement mode. In the phase measurement mode, the operating sequence SQ may enter a radiation interval RI at a point in time T2, and the operating sequence SQ may enter a calculation interval CI at a point in time T3. In the radiation interval RI and the calculation interval CI, the transmitter 110 may output the reference clock CLKr as the transmit clock CLKt. The transmit clock CLKt may form a waveform in the antenna 140 and the matching circuit 130, and a wireless signal corresponding to the generated waveform may be radiated from the antenna 140. If the waveform is stabilized during the radiation interval RI, as described with reference to FIG. 4, the phase difference $\Delta\theta$ between the reference clock CLKr and the extracted clock CLKe that is extracted from the generated waveform is determined during the calculation interval CI. The transmitter 110 may determine and store the phase selection information $\theta s$ in the phase control block 116 in response to the determined phase difference $\Delta\theta$.

After the phase measurement mode ends, the transmitter 110 may enter the transmission mode. Thereafter, a signal radiated from an external reader may be received as the receive signal RXS in the antenna 140 at a point in time T4. For example, the receive signal RXS may be a continuous wave. The receive signal RXS may be received through a receiver (not illustrated) and may be used to supply power to the NFC device 100.

The receive signal RXS may include reception information that is received at antenna 140 at a point in time T5. For example, the receive signal RXS may be of a form in which the reception information is added to the continuous wave. As the reception information is received, the operating sequence SQ may enter a reception interval RX. The receiver may interpret the reception information during the reception interval RX. When the reception interval RX ends, the receive signal RXS may be restored to a continuous wave that does not include the reception information.

The transmitter 110 may perform transmission at a point in time T6 to send transmission information as a response to the reception information that is received during the reception interval RX. The phase control block 116 may adjust the extraction clock CLKe which may be, for example, a clock which is extracted from the continuous wave of the receive signal RXS, based on the phase selection information $\theta s$ and may output the adjusted clock CLKa. The information signal SIGi, which may comprise the adjusted clock CLKa with the transmission information IF added thereto, may be radiated as the transmit signal TXS through the antenna 140.

Figure 6:
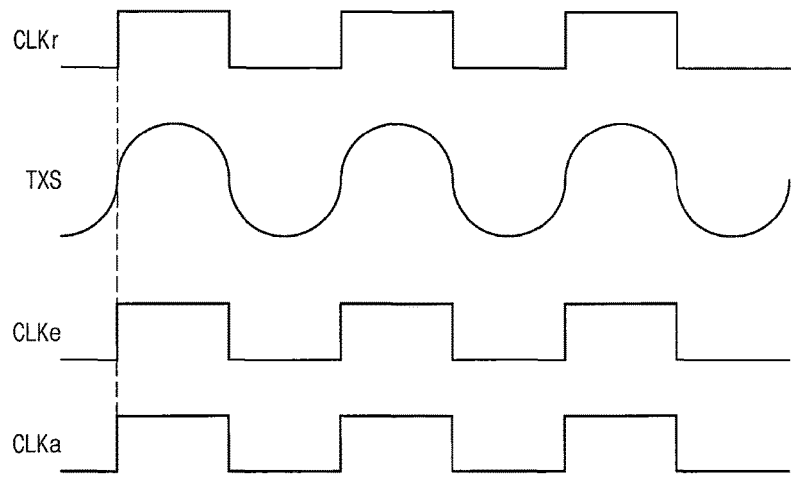
FIG. 6 shows examples of waveforms of a reference clock, a transmit signal, an extraction clock, and an adjusted clock when a resonant frequency of the NFC device is a first resonant frequency that coincides with a center frequency of a near field communication.

FIG. 6 shows an example of waveforms of the reference clock CLKr, the transmit signal TXS, the extraction clock CLKe, and the adjusted clock CLKa when the resonant frequency Fres of the NFC device 100 is a first resonant frequency that coincides with the center frequency FC of the near field communication. Referring to FIGS. 3, 4, and 6, since a path delay does not exist when the resonant frequency Fres coincides with the center frequency FC, a phase may not be changed. In this case, a phase of a waveform of the transmit signal TXS coincides with a phase of the reference clock CLKr. Also, a phase of the extraction clock CLKe extracted from the transmit signal TXS coincides with a phase of the reference clock CLKr. Accordingly, the phase difference $\Delta\theta$ is "0", and the phase selection information $\theta s$ for compensating for the phase difference $\Delta\theta$ may indicate "no phase adjustment". In the above-described case, the adjusted clock CLKa has the same phase as the extraction clock CLKe. That is, in the transmission mode, the phase control block 116 may output the extraction clock CLKe, which is extracted from the continuous wave of the receive signal RXS (refer to FIG. 5), as the adjusted clock CLKa without phase adjustment.

Figure 7:
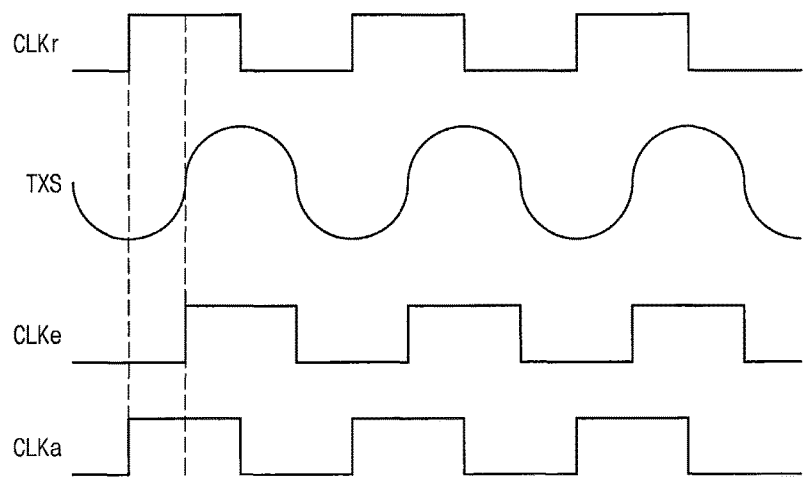
FIG. 7 shows example waveforms of the reference clock, the transmit signal, the extraction clock, and the adjusted clock when the resonant frequency of the NFC device is a second resonant frequency that is less than a center frequency of a near field communication.

FIG. 7 shows an example of waveforms of the reference clock CLKr, the transmit signal TXS, the extraction clock CLKe, and the adjusted clock CLKa when the resonant frequency Fres of the NFC device 100 is a second resonant frequency Fres1 that is less than the center frequency FC of the near field communication. Referring to FIGS. 3, 4, and 7, when the resonant frequency Fres is the second resonant frequency Fres1 that is less than the center frequency FC, a phase of a waveform of the transmit signal TXS is delayed relative to a phase of the reference clock CLKr. Also, a phase of the extraction clock CLKe that is extracted from the transmit signal TXS is delayed relative to a phase of the reference clock CLKr. As one example, the phase of the waveform of the transmit signal TXS and the phase of the extraction clock CLKe may be delayed by 90 degrees relative to the reference clock CLKr. In this case, the phase difference $\Delta\theta$ is "90 degrees (90°)", and the phase selection information $\theta s$ for compensating for the phase difference $\Delta\theta$ indicates "a 90-degree decrease (or advance)". In this case, the adjusted clock CLKa has a phase that is advanced by 90 degrees relative to the extraction clock CLKe. That is, in the transmission mode, the phase control block 116 may output an adjusted clock CLKa that is obtained by advancing a phase of the extraction clock CLKe, which is extracted from the continuous wave of the receive signal RXS (refer to FIG. 5), by 90 degrees.

Figure 8:
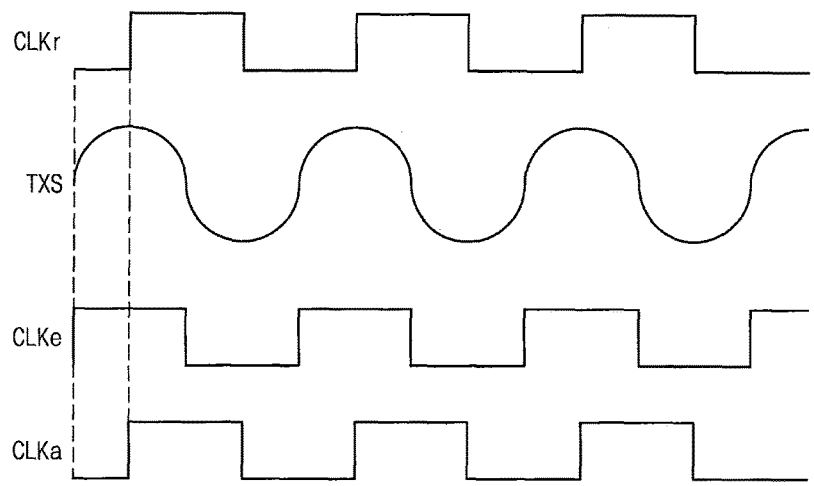
FIG. 8 shows example waveforms of the reference clock, the transmit signal, the extraction clock, and the adjusted clock when the resonant frequency of the NFC device is a third resonant frequency that is greater than a center frequency of a near field communication.

FIG. 8 shows an example of waveforms of the reference clock CLKr, the transmit signal TXS, the extraction clock CLKe, and the adjusted clock CLKa when the resonant frequency Fres of the NFC device 100 is a third resonant frequency Fres2 that is higher than the center frequency FC of the near field communication. Referring to FIGS. 3, 4, and 8, when the resonant frequency Fres is the third resonant frequency Fres2 that exceeds the center frequency FC, the phase of the waveform of the transmit signal TXS and the phase of the extraction clock CLKe that is extracted from the transmit signal TXS are advanced relative to a phase of the reference clock CLKr. As an example, the phase of the waveform of the transmit signal TXS and the phase of the extraction clock CLKe may be advanced by 90 degrees relative to the reference clock CLKr. In this case, the phase difference $\Delta\theta$ is "−90 degrees (−90°)", and the phase selection information $\theta s$ for compensating for the phase difference $\Delta\theta$ may indicate "a −90 degree increase (or delay)". With the above description, the adjusted clock CLKa has a phase that is delayed by 90 degrees relative to the extraction clock CLKe. That is, in the transmission mode, the phase control block 116 may output an adjusted clock CLKa that is obtained by delaying a phase of the extraction clock CLKe, which is extracted from the continuous wave of the receive signal RXS (refer to FIG. 5), by 90 degrees.

Figure 9:
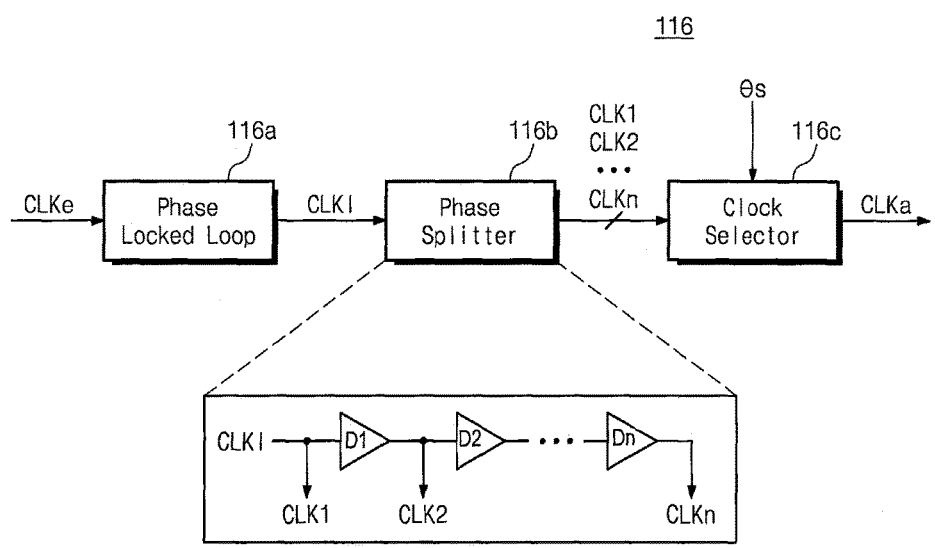
FIG. 9 is a block diagram illustrating an example of the phase control block of the NFC device of FIG. 4.

FIG. 9 is a block diagram illustrating an example of the phase control block 116 of the NFC device 100 of FIG. 4. Referring to FIGS. 4 and 9, the phase control block 116 includes a phase locked loop 116a, a phase splitter 116b, and a clock selector 116c.

The phase locked loop 116a may receive the extraction clock CLKe and output a phase locked clock CLK1 that has the same frequency as the extraction clock CLKe and the same phase as the extraction clock CLKe when the transmitter 110 operates in the transmission mode. For example, the phase locked loop 116a may output the phase locked clock CLK1 that has the same phase as the receive signal RXS or a continuous wave of the receive signal RXS before the transmission sequence TX (refer to FIG. 5) starts. If the phase locked clock CLK1 is output, the phase locked loop 116a may maintain a phase of the phase locked clock CLK1 even though a phase of the extraction clock CLKe changes. That is, even though a phase of the extraction clock CLKe changes due to mixing the transmit signal TXS and the receive signal RXS in the transmission sequence TX, the phase locked loop 116a may maintain the phase locked clock CLK1.

The phase splitter 116b may receive the phase locked clock CLK1 and may output a plurality of clocks CLK1 to CLKn that have the same frequency as the phase locked clock CLK1 and have different phases. For example, the phase splitter 116b may include a plurality of delays D1 to Dn that are serially connected to each other. A time delay of each delay D1 to Dn may be smaller than a quarter of a period of the phase locked clock CLK1. The phase locked clock CLK1 may be input to the first delay D1. The phase splitter 116b may output the plurality of clocks CLK1 to CLKn.

The clock selector 116c may select one of the plurality of clocks CLK1 to CLKn as the adjusted clock CLKa based on the phase selection information θs.

In some embodiments, the phase locked loop 116a may be omitted from the phase control block 116. If the phase locked loop 116a is omitted, the phase splitter 116b may generate the plurality of clocks CLK1 to CLKn using the extraction clock CLKe.

In the transmission sequence TX (refer to FIG. 5), a signal waveform formed in the antenna 140 and the matching circuit 130 corresponds to a mixed shape of the transmit signal TXS and the receive signal RXS, and the transmit signal TXS may be dominant. Accordingly, the extraction clock CLKe may follow the transmit signal TXS. Clock adjustment by the clock selector 116c may be accumulated every clock cycle due to iteration of the process in which the transmit signal TXS is extracted as the extraction clock CLKe, the extraction clock CLKe is output as the adjusted clock CLKa after being adjusted by the clock selector 116c, and the adjusted clock CLKa is sent as the transmit signal TXS. To prevent the above-described issue, the clock selector 116c may dynamically select the plurality of clocks CLK1 to CLKn. For example, the clock selector 116c may select a clock, which is designated by the phase selection information θs, of the clocks CLK1 to CLKn as a start clock, and then, may select the same or a different clock every clock cycle. For example, the clock selector 116c may select an output of the latter delay or an output of the former delay every clock cycle.

Figure 10:
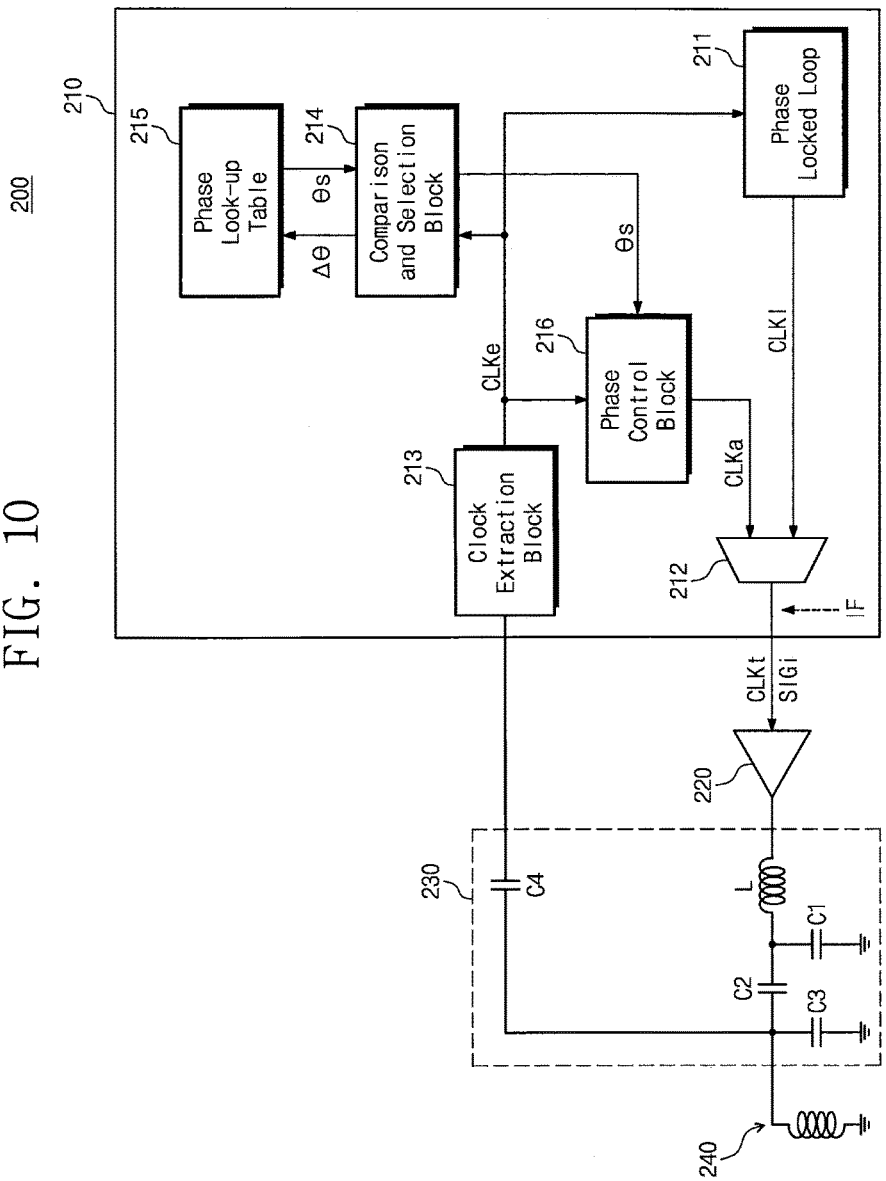
FIG. 10 is a schematic block diagram that illustrates an NFC device according to further embodiments of the inventive concepts.

FIG. 10 is a schematic block diagram that illustrates an NFC device 200 according to further embodiments of the inventive concepts. Referring to FIG. 10, the NFC device 200 includes a transmitter 210, a transmission amplifier 220, a matching circuit 230, and an antenna 240.

The transmission amplifier 220, the matching circuit 230, and the antenna 240 may be the same as the transmission amplifier 120, the matching circuit 130, and the antenna 140 of FIG. 4. A detailed description thereof is thus omitted.

The transmitter 210 includes a phase locked loop 211, a multiplexer 212, a clock extraction block 213, a comparison and selection block 214, a phase lookup table 215, and a phase control block 216.

In the phase measurement mode, the phase locked loop 211 may output a phase locked clock CLK1 that has the same frequency as the extraction clock CLKe and the same phase as the extraction clock CLKe.

The multiplexer 212 may output the phase locked clock CLK1 to the transmission amplifier 220 as the transmit clock CLKt in the phase measurement mode. The multiplexer 212 may output the adjusted clock CLKa in the transmission mode. In the transmission mode, the information signal SIGi in which the transmission information IF is added to the adjusted clock CLKa may be transmitted to the transmission amplifier 220.

The clock extraction block 213, the comparison and selection block 214, the phase lookup table 215, and the phase control block 216 may operate the same as the clock extraction block 113, the comparison and selection block 114, the phase lookup table 115, and the phase control block 116 of FIG. 4, respectively, except that the clock extraction block 213 transmits the extraction clock CLKe to the phase locked loop 211. A detailed description of these elements is thus omitted.

Figure 11:
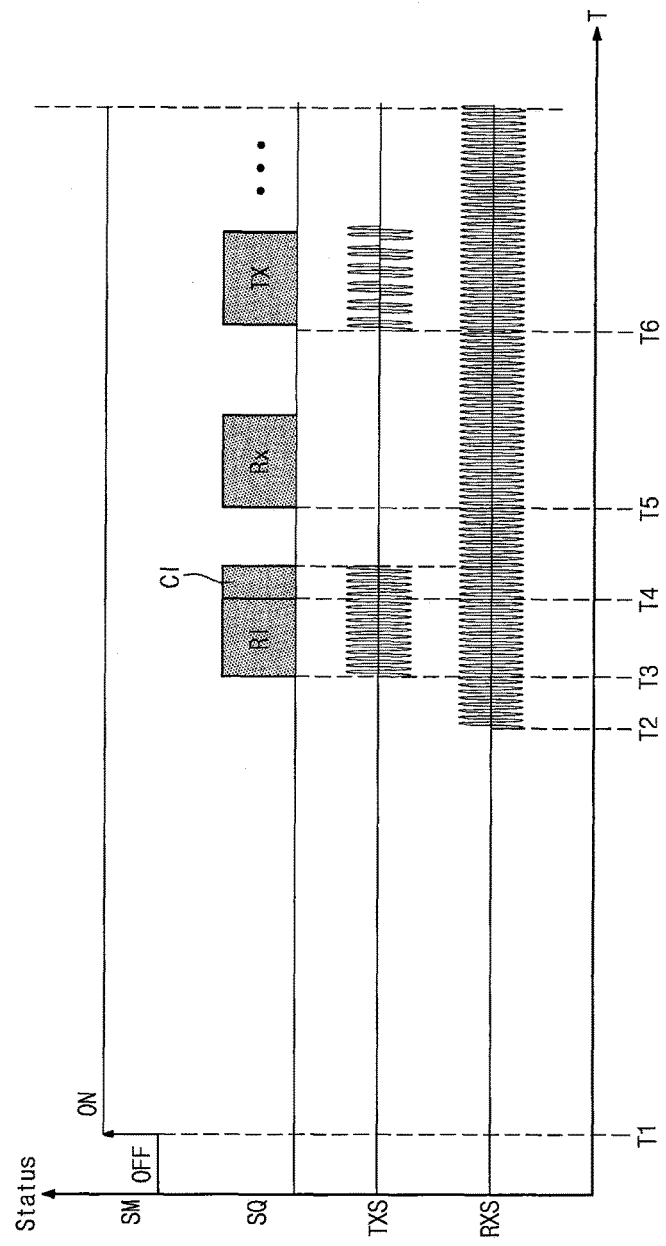
FIG. 11 is a graph illustrating an example in which the NFC device of FIG. 10 performs phase measurement and transmission in a card mode.

FIG. 11 is a graph illustrating an example in which the NFC device 200 of FIG. 10 performs phase measurement and adjustment and transmission in a card mode. In FIG. 11, the abscissa represents the time T, and the ordinate represents a service mode SM, an operating sequence SQ, a transmit signal TXS, and a receive signal RXS of the NFC device 200.

Referring to FIGS. 10 and 11, the service mode SM of the NFC device 200 is changed from an OFF state to an ON state at a point in time Ti. For example, at time T1 power may be supplied to the NFC device 200, or the NFC device 200 may be activated.

After the service mode SM is set to the ON state, a signal radiated from an external reader may be received as the receive signal RXS in the antenna 240 at a point in time T2. For example, the receive signal RXS may be a continuous wave. The receive signal RXS may be received through a receiver (not illustrated) and may be used to supply power to the NFC device 200.

After the receive signal RXS starts (at time T2) to be received and before the reception sequence RX starts, the transmitter 210 may enter the phase measurement mode. In the phase measurement mode (at time T5), the operating sequence SQ may enter a radiation interval RI at a point in time T3, and the operating sequence SQ may enter a calculation interval CI at a point in time T4. In the radiation interval RI and the calculation interval CI, the phase locked loop 211 of the transmitter 210 may output the phase locked clock CLK1 that has the same phase as the receive signal RXS or a continuous wave of the receive signal RXS. The transmitter 210 may output the phase locked clock CLK1 as the transmit clock CLKt to the transmission amplifier 220. The transmit clock CLKt may form a waveform in the antenna 240 and the matching circuit 230, and a wireless signal corresponding to the generated waveform may be radiated from the antenna 240. If the waveform is stabilized during the radiation interval RI, as described with reference to FIGS. 4 and 10, the phase difference Δθ is determined during the calculation interval CI. The transmitter 210 may determine and store the phase selection information θs in the phase control block 216 in response to the determined phase difference Δθ.

The receive signal RXS may include reception information (e.g., data, commands, etc.) that is received at antenna 240 at a point in time T5. For example, the receive signal RXS may comprise a continuous wave that has reception information added thereto. As the reception information is received at the receiver (not shown) of NFC device 200, the operating sequence SQ may enter a reception interval RX. The receiver may interpret the reception information during the reception interval RX. When the reception interval RX ends, the receive signal RXS may be a continuous wave that does not include reception information.

The transmitter 210 may perform transmission at a point in time T6 to send transmission information (e.g., data, commands, etc.) as a response to the reception information that is received during the reception interval RX. The phase control block 216 may adjust the extraction clock CLKe which may be, for example, a clock which is extracted from the continuous wave of the receive signal RXS, based on the phase selection information θs, and may output the adjusted clock CLKa. The information signal SIGi, which may comprise the adjusted clock CLKa with the transmission information IF added thereto, may be radiated as the transmit signal TXS through the antenna 240.

The NFC device 100 described with reference to FIGS. 4 and 5 may automatically detect the phase selection information θs using the reference clock generation block 111 before near field communication starts; on the other hand, the NFC device 200 described with reference to FIGS. 10 and 11 may detect the phase selection information θs using the receive signal RXS after near field communication starts.

Figure 12:
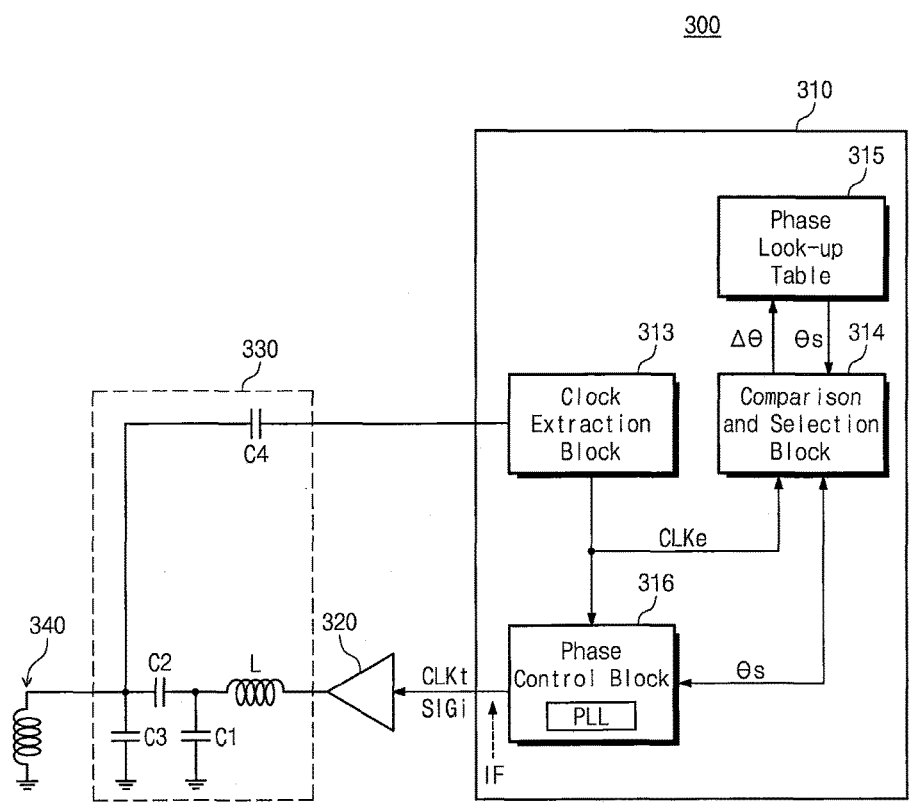
FIG. 12 is a schematic block diagram that illustrates an NFC device according to still further embodiments of the inventive concepts.

FIG. 12 is a schematic block diagram that illustrates an NFC device 300 according to still further embodiments of the inventive concepts. Referring to FIG. 12, the NFC device 300 includes a transmitter 310, a transmission amplifier 320, a matching circuit 330, and an antenna 340.

The transmission amplifier 320, the matching circuit 330, and the antenna 340 may be the same as the transmission amplifier 120, the matching circuit 130, and the antenna 140 of the NFC device 100 of FIG. 4. Accordingly, detailed description thereof is omitted.

The transmitter 310 includes a clock extraction block 313, a comparison and selection block 314, a phase lookup table 315, and a phase control block 316. As described with reference to FIG. 9, the phase control block 316 may include a phase locked loop PLL.

The phase locked loop PLL may output the phase locked clock CLK1, which has the same frequency as the extraction clock CLKe and the same phase as the extraction clock CLKe, to the transmission amplifier 320 as the transmit clock CLKt in the phase measurement mode. In the transmission mode, the phase locked loop PLL may adjust a phase of the phase locked clock CLK1 based on the phase selection information θs and may output the adjusted clock CLKa. The information signal SIGi, which comprises the adjusted clock CLKa with the transmission information IF added thereto, is transmitted to the transmission amplifier 320 in the transmission mode.

The clock extraction block 313, the comparison and selection block 314, the phase lookup table 315, and the phase control block 316 may operate the same as the clock extraction block 113, the comparison and selection block 114, the phase lookup table 115, and the phase control block 116 of FIG. 4. Accordingly, detailed description thereof is omitted.

The transmitter 210 of FIG. 10 includes the phase locked loop 211 that generates the phase locked clock CLK1 in the phase measurement mode. Accordingly, as described with reference to FIG. 9, the phase control block 216 may include the phase locked loop 116a or may not include the phase locked loop 116a. In contrast, the transmitter 310 of FIG. 12 may use the phase locked loop PLL of the phase control block 316 in both the phase measurement mode and the transmission mode.

Figure 13:
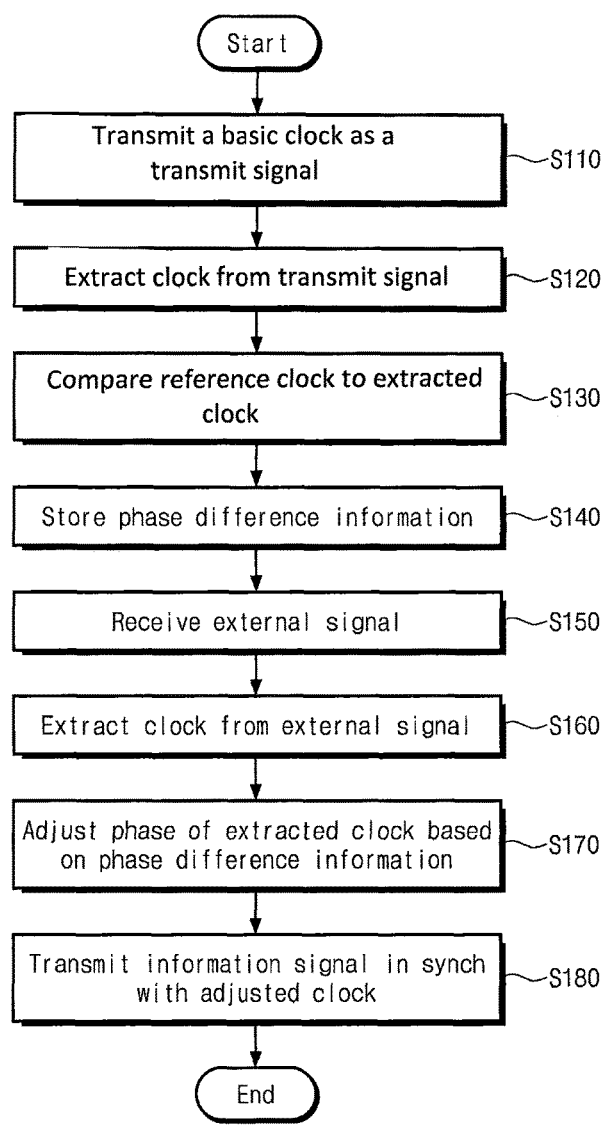
FIG. 13 is a flowchart illustrating a method of operating an NFC device according to an embodiment of the inventive concepts.

FIG. 13 is a flowchart illustrating method of operating an NFC device according to an embodiment of the inventive concepts. Referring to FIGS. 4, 10, 12, and 13, in operation S110, the transmitter 110, 210, or 310 of the NFC device 100, 200, or 300 may send a basic clock as the transmit clock CLKt to the transmit amplifier 120, 130, 140. The basic clock may be the reference clock CLKr that is generated by the reference clock generation block 111 or the phase locked clock CLK1 that is generated by the phase locked loop 211 or PLL. The transmit clock CLKt is transmitted by the NFC device as a transmit signal TXS.

In operation S120, the transmitter 110, 210, or 310 may extract, for example, the extraction clock CLKe from the transmit signal TXS.

In operation S130, the transmitter 110, 210, or 310 may compare the reference clock CLKr or CLK1 to the extraction clock CLKe.

In operation S140, the transmitter 110, 210, or 310 may store phase difference information between the reference clock CLKr or CLK1 and the extraction clock CLKe, for example, the phase selection information θs or the phase difference Δθ.

In operation S150, the transmitter 110, 210, or 310 may receive an external signal. For example, the transmitter 110, 210, or 310 may receive a continuous wave from an external NFC device.

In operation S160, the transmitter 110, 210, or 310 may extract a clock from the received external signal.

In operation S170, the transmitter 110, 210, or 310 may adjust a phase of the extracted clock CLKe based on the phase difference information to provide an adjusted clock CLKa.

In operation S180, the transmitter 110, 210, or 310 may transmit an information signal in synchronization with the adjusted clock CLKa.

Figure 14:
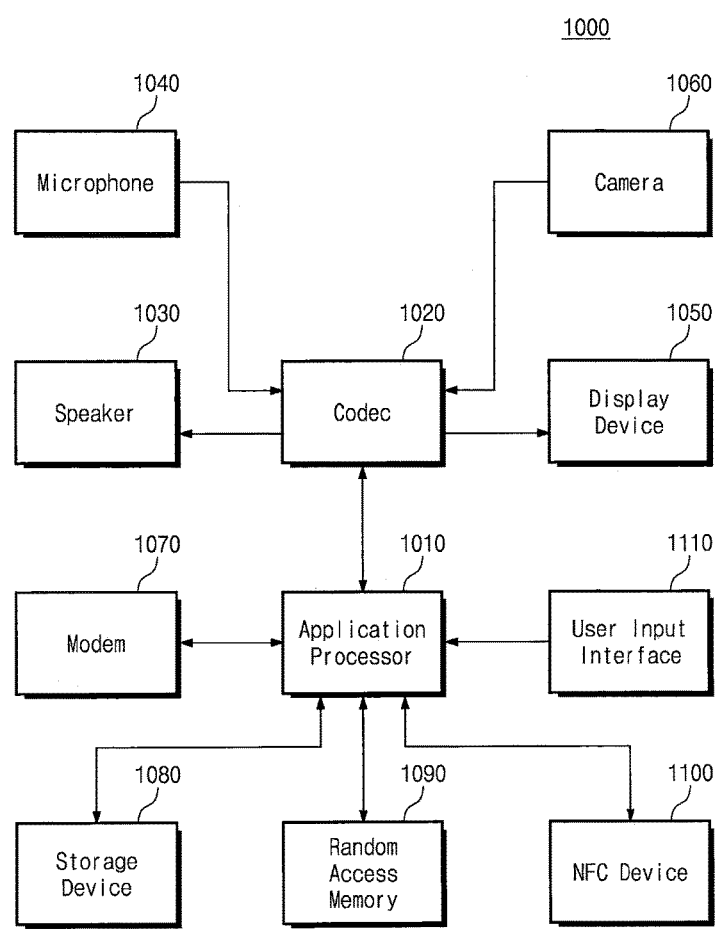
FIG. 14 is a block diagram illustrating a mobile device according to an embodiment of the inventive concepts.

FIG. 14 is a block diagram illustrating a mobile device 1000, according to an embodiment of the inventive concepts. Referring to FIG. 14, the mobile device 1000 includes an application processor 1010, a codec 1020, a speaker 1030, a microphone 1040, a display device 1050, a camera 1060, a modem 1070, a storage device 1080, a random access memory 1090, a NFC device 1100 and a user input interface 1110.

The application processor 1010 may drive an operating system that operates the mobile device 1000 and may drive various applications on the operating system. The codec 1020 may perform coding and decoding of signals such as, for example, an image signal. The codec 1020 may perform a task associated with processing a voice signal or an image signal under delegation of the application processor 1010.

The speaker 1030 may play a voice signal from the codec 1020. The microphone 1040 may detect sound sensed from the outside, may convert the detected sound into a voice signal, and may output the voice signal to the codec 1020.

The display device 1050 may play an image signal from the codec 1020. The camera 1060 may convert a scene in a range of vision into an electrical image signal and may output the image signal to the codec 1020.

The modem 1070 may perform wireless or wired communication with an external device. In response to a request of the application processor 1010, the modem 1070 may transmit data to an external device or may request data from the external device. The storage device 1080 may be main storage of the mobile device 1000. The storage device 1080 may be used to store data for a long time and may retain data stored therein even at power-off. The random access memory 1090 may be a main memory of the mobile device 1000. The random access memory 1090 may be used for the master devices, such as the application processor 1010, the modem 1070, and the codec 1020, to temporarily store data.

The NFC device 1100 may be the NFC device 100, 200, or 300 described with reference to FIGS. 1 to 13. The NFC device 1100 may operate as a reader or a card. The NFC device 1100 may detect a phase difference and may adjust a phase of a transmit clock based on the detected phase difference. Accordingly, accuracy of the NFC device 1100 may be improved, and the reliability of the mobile device 1000 may be improved.

The user input interface 1110 may include various devices for receiving an input from a user. For example, the user input interface 1110 may include devices, which directly receive an input from the user, such as touch panels, touch screens, buttons, and keyboards, or devices, which indirectly receive results generated by actions of the user, such as an, optical sensor, a proximity sensor, a gyroscope sensor, and a pressure sensor.

According to embodiments of the inventive concepts, a communication distance may be substantially maintained even though a center frequency of the signal transmission and a resonant frequency of a near field communication device differ from each other. Accordingly, near field communication devices may be provided that may exhibit improved communication quality.

While the inventive concepts have been described with reference to exemplary embodiments, it will be apparent to those skilled in the art that various changes and modifications may be made without departing from the spirit and scope of the inventive concepts. Therefore, it should be understood that the above embodiments are not limiting, but illustrative.

What is claimed is:

1. A near field communication device comprising:
   an antenna;
   a transmission amplifier;
   a matching circuit connected between the antenna and the transmission amplifier; and
   a transmitter configured to transmit a transmit clock to the matching circuit through the transmission amplifier, to extract an extraction clock from a waveform formed in the matching circuit, to determine information relating to a phase difference between the transmit clock and the extraction clock, and to control transmission of an information signal through the antenna, the transmission amplifier, and the matching circuit based on the determined information relating to the phase difference,
   wherein the waveform formed in the matching circuit is formed in response to transmission of the transmit clock to the matching circuit.

2. The near field communication device of claim 1, wherein the transmitter comprises:
   a comparison and selection block configured to compare a phase of the extraction clock with a phase of the transmit clock and to generate phase selection information corresponding to the phase difference based on a result of the comparison.

3. The near field communication device of claim 2, wherein the transmitter further comprises:
   a phase lookup table configured to store phase differences and pieces of phase selection information corresponding to the respective phase differences, and
   wherein the comparison and selection block uses the determined information relating to the phase difference and the lookup table to generate the phase selection information.

4. The near field communication device of claim 1, wherein the transmitter operates in one of a phase measurement mode and a transmission mode, and
   wherein the transmitter further comprises:
   a phase control block configured to store information about the phase difference in the phase measurement mode.

5. The near field communication device of claim 4, wherein the stored information comprises phase selection information.

6. The near field communication device of claim 4, wherein, in the transmission mode, the waveform formed in the matching circuit is formed in response to a signal received from an external source, and wherein the phase control block outputs an adjusted clock by adjusting a phase of the extraction clock based at least in part on the information relating to the phase difference.

7. The near field communication device of claim 6, wherein the transmitter further comprises:
   a reference clock generation block configured to output a reference clock; and
   a multiplexer configured to select the reference clock as the transmit clock in the phase measurement mode so as to be transmitted to the transmission amplifier and to select the adjusted clock as the transmit clock in the transmission mode so as to be transmitted to the transmission amplifier.

8. The near field communication device of claim 7, wherein transmission information is added to the adjusted clock prior to transmission of the adjusted clock by the transmission amplifier.

9. The near field communication device of claim 6, wherein the phase control block comprises:
   a phase locked loop configured to output a phase locked clock locked at the phase of the extraction clock;
   a phase splitter configured to generate a plurality of clocks having different phases by adjusting the phase of the phase locked clock; and
   a clock selector configured to select one of the clocks as the adjusted clock based on the stored information about the phase difference.

10. The near field communication device of claim 6, wherein the phase control block comprises:
   a phase splitter configured to generate a plurality of clocks having different phases; and
   a clock selector configured to select one of the clocks as the adjusted clock based on the stored information about the phase difference,
   wherein the one of the clocks that is selected by the clock selector using the information about the phase difference changes as a cycle of the extraction clock progresses over time.

11. A near field communication device comprising:
an antenna;
a transmission amplifier;
a matching circuit connected between the antenna and the transmission amplifier; and
a transmitter configured to extract a first extraction clock from a first waveform formed in the matching circuit, transmit a transmit clock, by selecting the first extraction clock as the transmit clock, to the matching circuit through the transmission amplifier, to extract a second extraction clock from a second waveform formed in the matching circuit while transmitting the transmit clock through the matching circuit, and to detect a phase difference between the transmit clock and the second extraction clock.

12. The near field communication device of claim 11, wherein the transmitter operates in one of a phase measurement mode and a transmission mode, wherein the first waveform formed in the matching circuit is formed in response to a signal received from an external source, wherein the transmitter transmits the transmit clock, extracts the second extraction clock, and detects the phase difference in the phase measurement mode, and wherein the transmitter further comprises:
a phase control block configured to store information about the phase difference in the phase measurement mode, the phase control block comprising:
a phase locked loop configured to output a phase locked clock locked at a phase of the first extraction clock; and
wherein the phase control block transmits the phase locked clock to the transmission amplifier in the phase measurement mode and transmits an adjusted clock to the transmission amplifier in the transmission mode,
wherein the adjusted clock is generated by adjusting a phase of the first extraction clock based at least in part on the phase difference.

13. The near field communication device of claim 1, wherein the phase difference indicates information about a difference between a resonant frequency of the antenna and the matching circuit and a center frequency of the transmit clock.

14. The near field communication device of claim 13, wherein the extraction clock is delayed relative to the transmit clock when the resonant frequency is lower than the center frequency, and
wherein the extraction clock is advanced relative to the transmit clock when the resonant frequency is higher than the center frequency.

15. The near field communication device of claim 11, wherein the transmitter operates in one of a phase measurement mode and a transmission mode, wherein the first waveform formed in the matching circuit is formed in response to a signal received from an external source, wherein the transmitter transmits the transmit clock, extracts the second extraction clock, and detects the phase difference in the phase measurement mode, and wherein the transmitter further comprises:
a phase locked loop configured to output a phase locked clock locked at a phase of the first extraction clock; and
a multiplexer configured to select the phase locked clock as the transmit clock in the phase measurement mode so as to be transmitted to the transmission amplifier and to select an adjusted clock as the transmit clock in the transmission mode so as to be transmitted to the transmission amplifier,
wherein the adjusted clock is generated by adjusting a phase of the first extraction clock based at least in part on the phase difference.

16. The near field communication device of claim 11, wherein the transmitter extracts a third extraction clock from a third waveform of a signal received through the antenna from the outside, generates an adjusted clock by adjusting a phase of the third extraction clock based on the detected difference, and transmits an information signal through the transmission amplifier, the matching circuit, and the antenna using the adjusted clock.

17. A near field communication device comprising:
an antenna;
a transmission amplifier;
a matching circuit connected between the antenna and the transmission amplifier; and
a transmitter that operates in one of a phase measurement mode and a transmission mode and that is configured to transmit a transmit clock to the matching circuit through the transmission amplifier, the transmitter comprising:
a multiplexer that is configured to select a first clock as the transmit clock in the phase measurement mode so as to be transmitted to the transmission amplifier to detect a phase difference between the transmit clock and a first extraction clock extracted from the matching circuit while transmitting the transmit clock through the matching circuit and to select a second clock as the transmit clock in the transmission mode so as to be transmitted to the transmission amplifier,
wherein the second clock is based on the phase difference.

18. The near field communication device of claim 17, wherein the transmitter is further configured to extract a second extraction clock from the matching circuit, to adjust a phase of the second extraction clock according to the phase difference to generate the second clock.

19. The near field communication device of claim 17, wherein the transmitter is further configured to extract a third extraction clock from the matching circuit to generate the first clock.

20. The near field communication device of claim 17, wherein the transmitter further comprises a reference clock generation block configured to generate the first clock.

* * * * *